US012619252B1

(12) United States Patent
Jia et al.

(10) Patent No.: US 12,619,252 B1
(45) Date of Patent: May 5, 2026

(54) METHOD FOR PROCESSING DATA OF 3D POINT CLOUD MAP, CONTROLLER, AND AUTONOMOUS MOBILE MACHINE

(71) Applicant: VisionNav Robotics USA Inc., Acworth, GA (US)

(72) Inventors: Shuai Jia, Acworth, GA (US); Fan Zheng, Acworth, GA (US); Jianhong Xu, Acworth, GA (US)

(73) Assignee: VISONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/280,820

(22) Filed: Jul. 25, 2025

(51) Int. Cl.
| | |
|---|---|
| *G05D 1/00* | (2024.01) |
| *B66F 9/06* | (2006.01) |
| *B66F 9/075* | (2006.01) |
| *G01S 17/89* | (2020.01) |
| *G05D 1/246* | (2024.01) |
| *G05D 109/10* | (2024.01) |

(52) U.S. Cl.
CPC ............. *G05D 1/246* (2024.01); *B66F 9/063* (2013.01); *B66F 9/0755* (2013.01); *G01S 17/89* (2013.01); *G05D 2109/10* (2024.01)

(58) Field of Classification Search
CPC .... G05D 1/246; G05D 2109/10; B66F 9/063; B66F 9/0755; G01S 17/89
USPC .......................................... 701/25
See application file for complete search history.

(56) References Cited

U.S. PATENT DOCUMENTS

| | | | | |
|---|---|---|---|---|
| 11,450,120 | B2 * | 9/2022 | Shlens | G06V 10/82 |
| 2020/0005486 | A1 * | 1/2020 | Sinha | G06T 7/337 |
| 2020/0160068 | A1 * | 5/2020 | Silver | G06F 18/217 |
| 2020/0183009 | A1 * | 6/2020 | Iwai | G01S 17/86 |
| 2021/0180961 | A1 * | 6/2021 | Oh | G01C 21/30 |
| 2022/0334589 | A1 * | 10/2022 | Lee | G05D 1/0238 |
| 2025/0377207 | A1 * | 12/2025 | Yun | G01C 21/28 |

FOREIGN PATENT DOCUMENTS

| | | | | |
|---|---|---|---|---|
| CN | 108564525 A | 9/2018 | | |
| CN | 109919955 A | 6/2019 | | |
| WO | WO-2021003487 A1 * | 1/2021 | .......... | G06N 3/0464 |
| WO | WO-2024138224 A1 * | 6/2024 | .............. | G06T 7/55 |

* cited by examiner

*Primary Examiner* — Tuan C To
(74) *Attorney, Agent, or Firm* — MUNCY, GEISSLER, OLDS & LOWE, P.C.

(57) ABSTRACT

A method for processing data of a three-dimensional (3D) point cloud map, a controller, and an autonomous mobile machine are provided. The method for processing data of a 3D point cloud map includes: performing two-dimensional (2D) processing on point cloud data of the 3D point cloud map to generate 2D point cloud data, at least one boundary of the 3D point cloud map being a straight line; performing straight line extraction processing on the 2D point cloud data to generate straight line data; calculating a rotation angle of the 3D point cloud map based on the straight line data; and rotating the 3D point cloud map based on the rotation angle, to enable at least one boundary of the 3D point cloud map to be parallel to at least one coordinate axis of a world coordinate system.

20 Claims, 17 Drawing Sheets

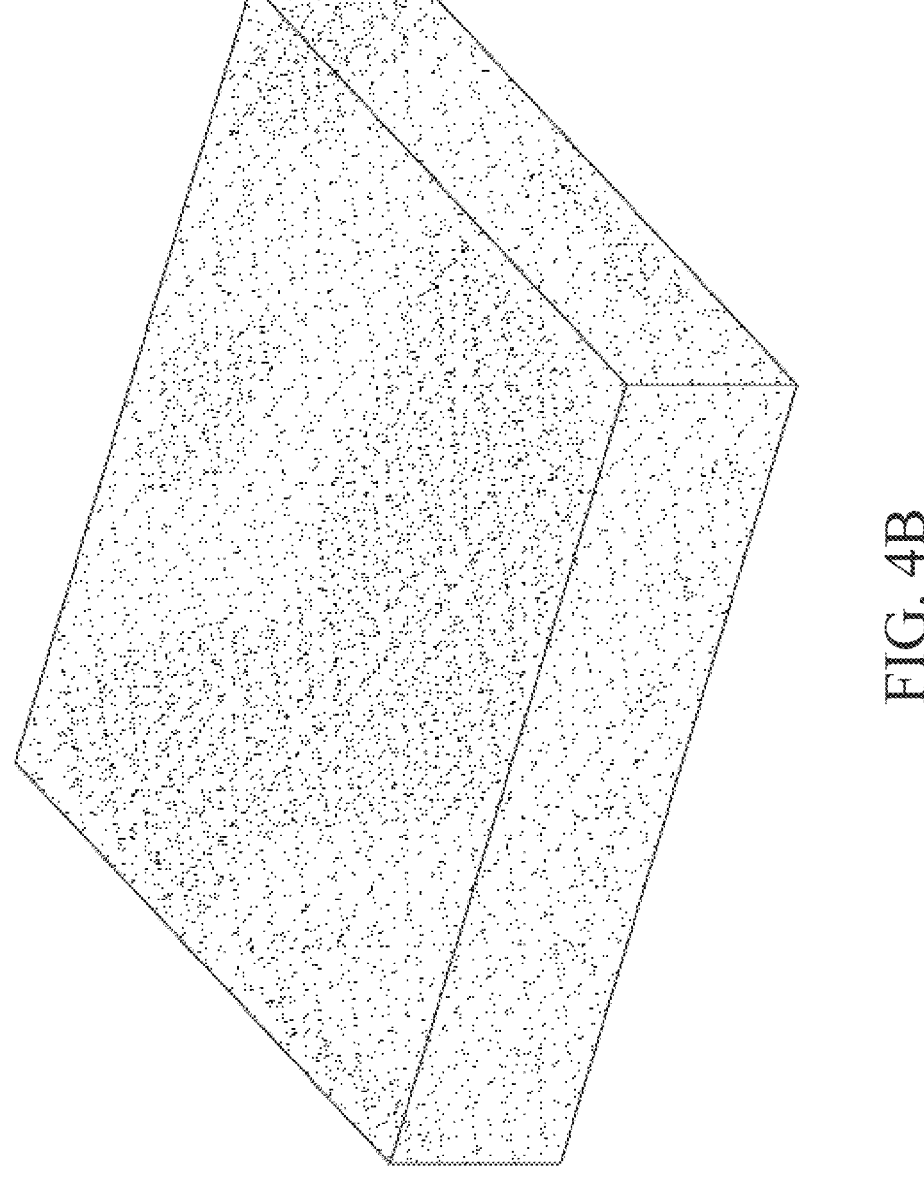
FIG. 4B

METHOD FOR PROCESSING DATA OF 3D POINT CLOUD MAP, CONTROLLER, AND AUTONOMOUS MOBILE MACHINE

FIELD OF THE INVENTION

This disclosure relates to the field of map data processing, and in particular, to a method for processing data of a three-dimensional (3D) point cloud map, a controller, and an autonomous mobile machine.

BACKGROUND

During establishment of a three-dimensional (3D) point cloud map, an initial pose of an autonomous mobile machine easily affects a shape and a direction of an established map, which causes a wall point cloud to fail to be substantially orthogonal to a world coordinate system in a top view of the 3D point cloud map, thus resulting in relatively poor readability of the 3D point cloud map and hindering direction identification. In addition, a movement task path fails to be orthogonal to the world coordinate system during generation, bringing much inconvenience to construction or operation personnel. Currently, in engineering, a solution of manually rotating a 3D laser point cloud map to be orthogonal to the world coordinate system is adopted. However, this solution has uncontrollable operation precision and a relatively low automation degree.

BRIEF DESCRIPTION OF THE DRAWINGS

The drawings are intended to provide further understanding of this disclosure, and constitute a part of the specification. The drawings are used together with the following specific implementations for explaining this disclosure, but do not constitute a limitation on this disclosure. In the drawings:

FIG. 4A, FIG. 4B, and FIG. 4C are schematic diagrams of downsampling according to an embodiment of this disclosure.

DETAILED DESCRIPTION

Figure 1A:
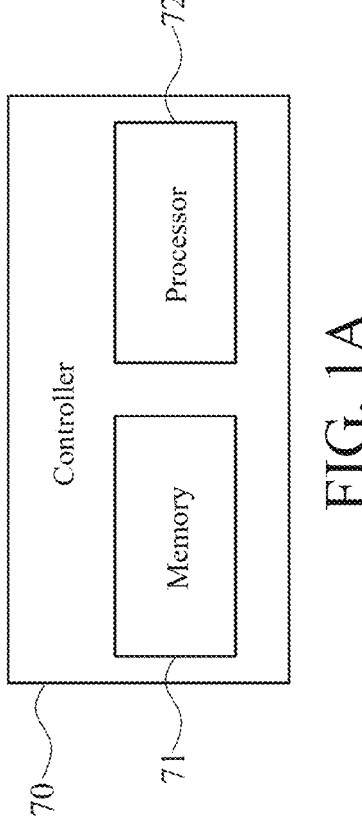
FIG. 1A is a schematic block diagram of a controller according to an embodiment of this disclosure.

The following disclosure provides a plurality of implementations or examples, which may be used for achieving different features of the disclosure. The following specific examples of assemblies and configurations are used for simplifying the disclosure. It may be conceived that, the descriptions are merely examples and are not intended to limit the disclosure. For example, in the following description, that a first feature is formed on or above a second feature may include some embodiments in which the first feature and the second feature are in direct contact with each other, or may include some embodiments in which an additional assembly is formed between the first feature and the second feature, so that the first feature and the second feature may not be in direct contact with each other. In addition, in the disclosure, assembly symbols and/or labels may be reused in a plurality of embodiments. The reuse is for simplicity and clarity, and does not represent a relationship between different embodiments and/or configurations that are discussed.

Furthermore, use of terms spatially relative to each other such as "under", "below", "lower than", "on", "above" and similar terms thereof may be used for facilitating description of a relationship between an assembly or a feature shown in a figure and another assembly or feature or more assemblies or features. In addition to orientations shown in the figure, the terms spatially relative to each other are further intended to encompass a plurality of different orientations during usage or operation of an apparatus. The device may be placed in another orientation (for example, may be rotated by 90 degrees or located in another orientation), and the terms spatially relative to each other should be explained accordingly.

Although numerical value ranges and parameters used for defining a relatively wide range of this disclosure are approximate numerical values, relevant numerical values in specific embodiments are presented herein as accurately as possible. However, any numerical value essentially inevitably includes a standard deviation caused by a test method. Herein, "about" usually means that an actual numerical value falls within ±10%, 5%, 1%, or 0.5% of a specific numerical value or range. Alternatively, the term "about" represents that the actual numerical value falls within an acceptable standard error, which depends on a consideration of a person of ordinary skill in the art. It may be understood that, except experimental examples, or unless otherwise specified, all ranges, quantities, numerical values, and percentages (which are, for example, used for describing a material dosage, a duration, a temperature, an operating condition, a quantity ratio, and another similar factor) used herein are modified by "about". Therefore, unless otherwise specified, the numerical parameters disclosed in this specification and the appended claims are all approximate numerical values and may be changed as required. The numerical parameters should at least be understood as numerical values obtained by applying a general notation system to stated significant digits. Herein, the numerical value ranges are represented as a range from an end point to another end point or a range between two endpoints. Unless otherwise specified, all numerical value ranges described herein include endpoints.

FIG. 1A is a schematic block diagram of a controller 70 according to an embodiment of this disclosure. In some embodiments, the controller 70 includes a memory 71 and a processor 72. In some embodiments, the processor 72 is operably coupled to the memory 71. In some embodiments, the processor 72 may be an integrated element. The processor 72 may be composed of a plurality of processing units. The processor 72 may include a computing unit or core computing unit. The processor 72 may be configured to load information from the memory 71. The processor 72 may store information in the memory 71. The processor 72 may receive data from other hardware devices. The processor 72 may process data from other hardware devices.

In some embodiments, the memory 71 may be an integrated element. The memory 71 may be composed of a plurality of storage units. Information, such as but not limited to, a point cloud path, a pose, and a key frame, may be respectively stored in different storage units or stored in a same storage unit. In some embodiments, the memory 71 stores a program instruction, and the processor 72 loads and executes the program instruction from the memory 71 to perform the method for processing data of a 3D point cloud map provided in this disclosure.

Figure 1B:
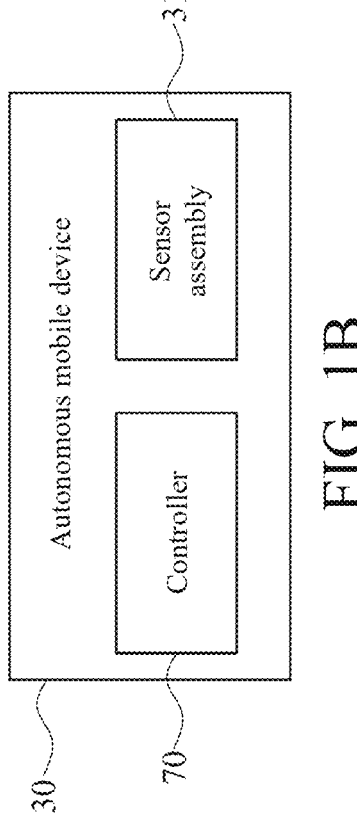
FIG. 1B is a schematic block diagram of an autonomous mobile machine according to an embodiment of this disclosure.

FIG. 1B is a schematic block diagram of an autonomous mobile machine 30 according to an embodiment of this disclosure. In some embodiments, the autonomous mobile machine 30 includes the controller 70 shown in FIG. 1A and a sensor assembly 31. In some embodiments, the controller 70 is operably coupled to the sensor assembly 31. In some embodiments, the controller 70 may be a plug and play apparatus. In some embodiments, the controller 70 may be connected to the autonomous mobile machine 30 in a wired or wireless manner. In some embodiments, the sensor assembly 31 is an integrated element. The sensor assembly 31 may be composed of a plurality of sensor elements. In some embodiments, the sensor assembly 31 includes a laser sensor to establish a three-dimensional (3D) point cloud map. In some embodiments, the sensor assembly 31 may further include other sensor assemblies to meet an operation demand of the autonomous mobile machine 30.

Figure 1C:
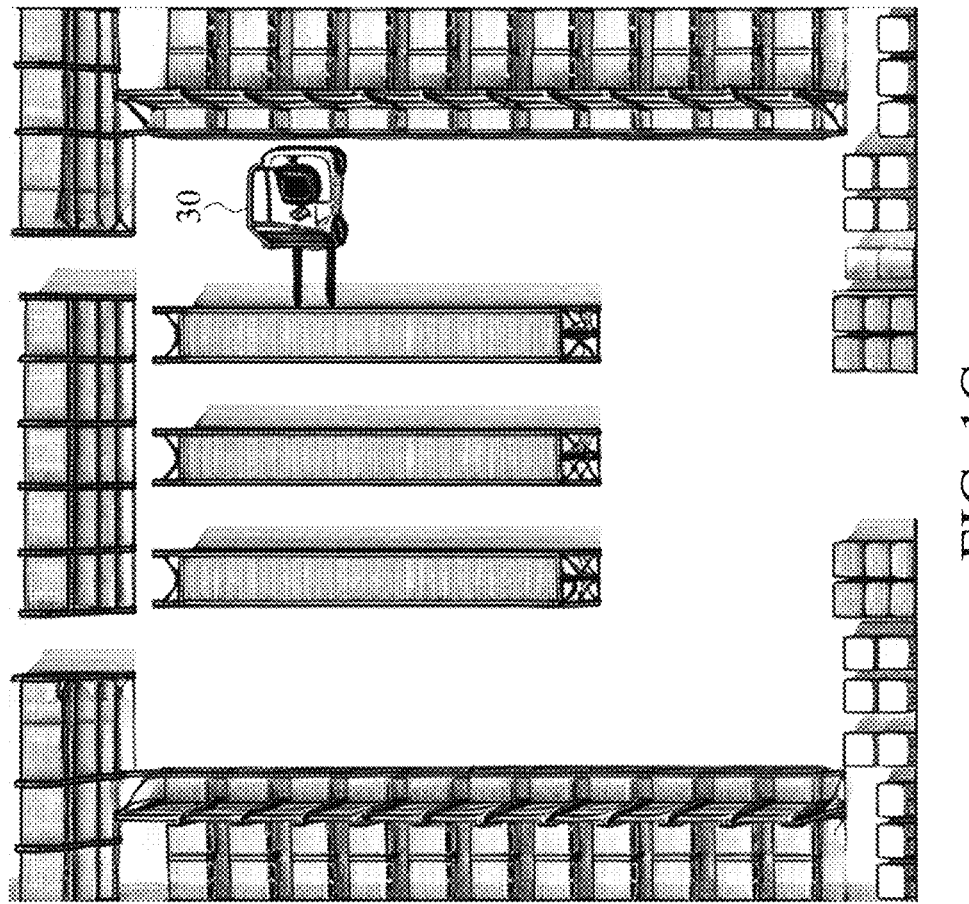
FIG. 1C is a schematic diagram of the autonomous mobile machine applied to a warehouse according to an embodiment of this disclosure.

In some embodiments, the autonomous mobile machine 30 is a mobile machine that can perform a task autonomously or semi-autonomously. Common forms of the autonomous mobile machine include an automated guided vehicle (AGV), an autonomous mobile robot (AMR), a humanoid robot, etc., as well as other forms such as a smart car and a robot vacuum cleaner. Specifically, the autonomous mobile machine 30 may alternatively be an unmanned vehicle applied to a warehouse, for example, an automated forklift. Referring to FIG. 1C, FIG. 1C is a schematic diagram of the autonomous mobile machine 30 applied to a warehouse according to an embodiment of this disclosure. The autonomous mobile machine 30 may retrieve goods from a warehouse area based on instructions, and place the goods precisely at a designated position. Through collaboration of the sensor assembly 31 and the controller 70, real-time data-based dynamic path planning is achieved, thereby avoiding collisions and improving operation efficiency. It should be noted that the implementation of the autonomous mobile machine 30 shown in FIG. 1C is merely for illustrative purposes and does not limit this disclosure. In addition, the disclosure of the autonomous mobile machine 30 is not limited to an unmanned forklift. In another embodiment, the autonomous mobile machine 30 may be any intelligent mobile apparatus.

Figure 2:
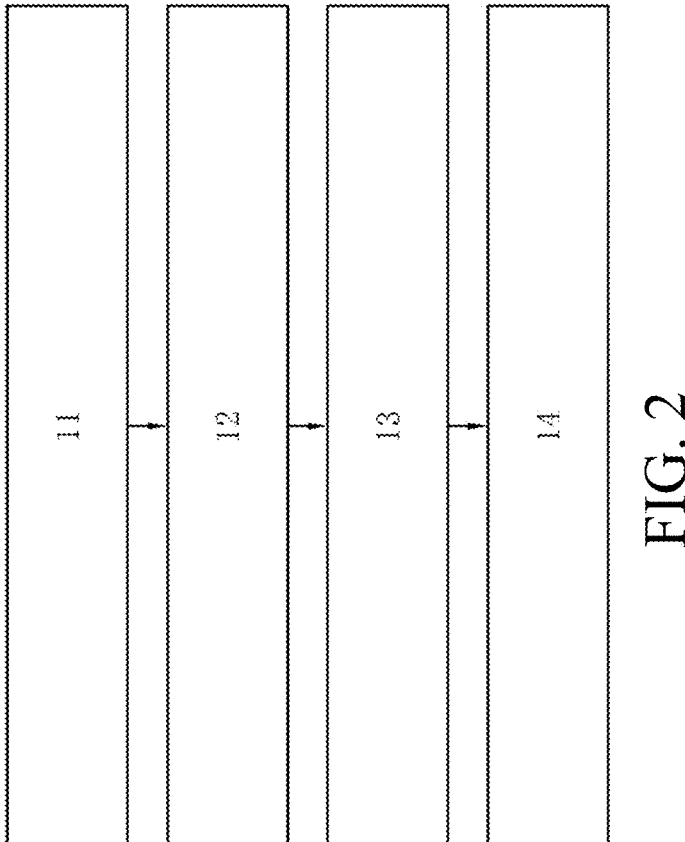
FIG. 2 is a method flowchart of a method for processing data of a three-dimensional (3D) point cloud map according to an embodiment of this disclosure.

FIG. 2 is a method flowchart of a method 10 for processing data of a 3D point cloud map according to an embodiment of this disclosure. If a substantially same result can be obtained, the implementation of this disclosure is not completely limited to the steps of the process shown in FIG. 2. The method 10 for processing data of a 3D point cloud map is applicable to the controller 70 shown in FIG. 1A and the autonomous mobile machine 30 shown in FIG. 1B. In some embodiments, steps of the method 10 for processing data of a 3D point cloud map may be performed by different control units/processing units or a same control unit/processing unit in the processor 72. In some embodiments, the method 10 for processing data of a 3D point cloud map may include step 11, step 12, step 13, and step 14.

In some embodiments, in step 11, the processor 72 performs two-dimensional (2D) processing on point cloud data of the 3D point cloud map to generate 2D point cloud data. In some embodiments, at least one boundary of the 3D point cloud map is a straight line.

Figure 3:
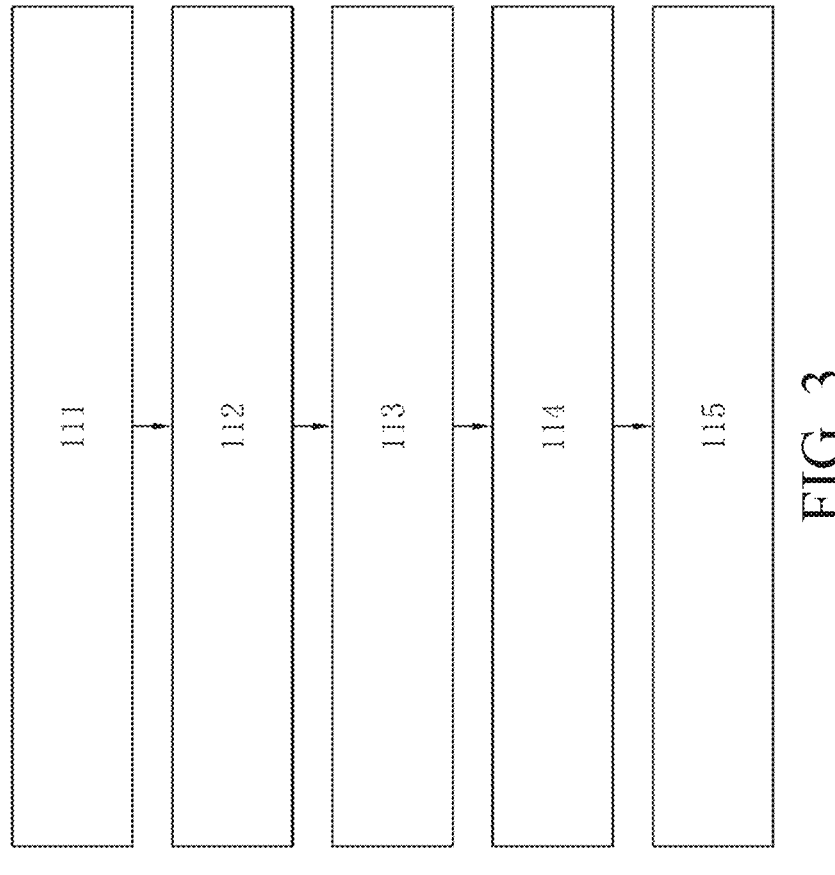
FIG. 3 is a detailed method process of step 11 according to an embodiment of this disclosure.

For a detailed description of step 11, refer to FIG. 3. FIG. 3 is a detailed method process of step 11 according to an embodiment of this disclosure. If a substantially same result can be obtained, the implementation of this disclosure is not completely limited to the steps of the process shown in FIG. 3. In some embodiments, step 11 may include step 111, step 112, step 113, step 114, and step 115.

Figure 4A:
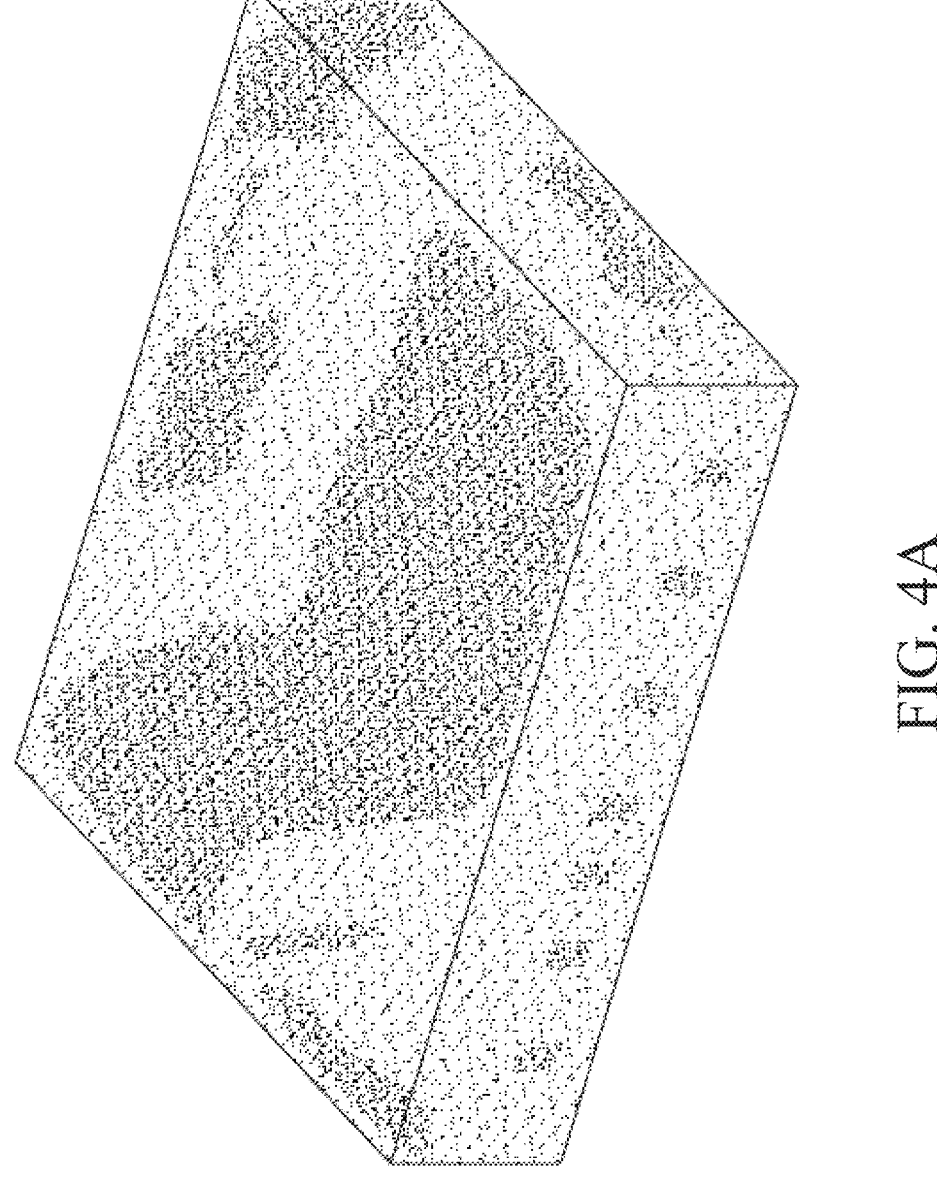
Figure 4A:
Figure 4C:
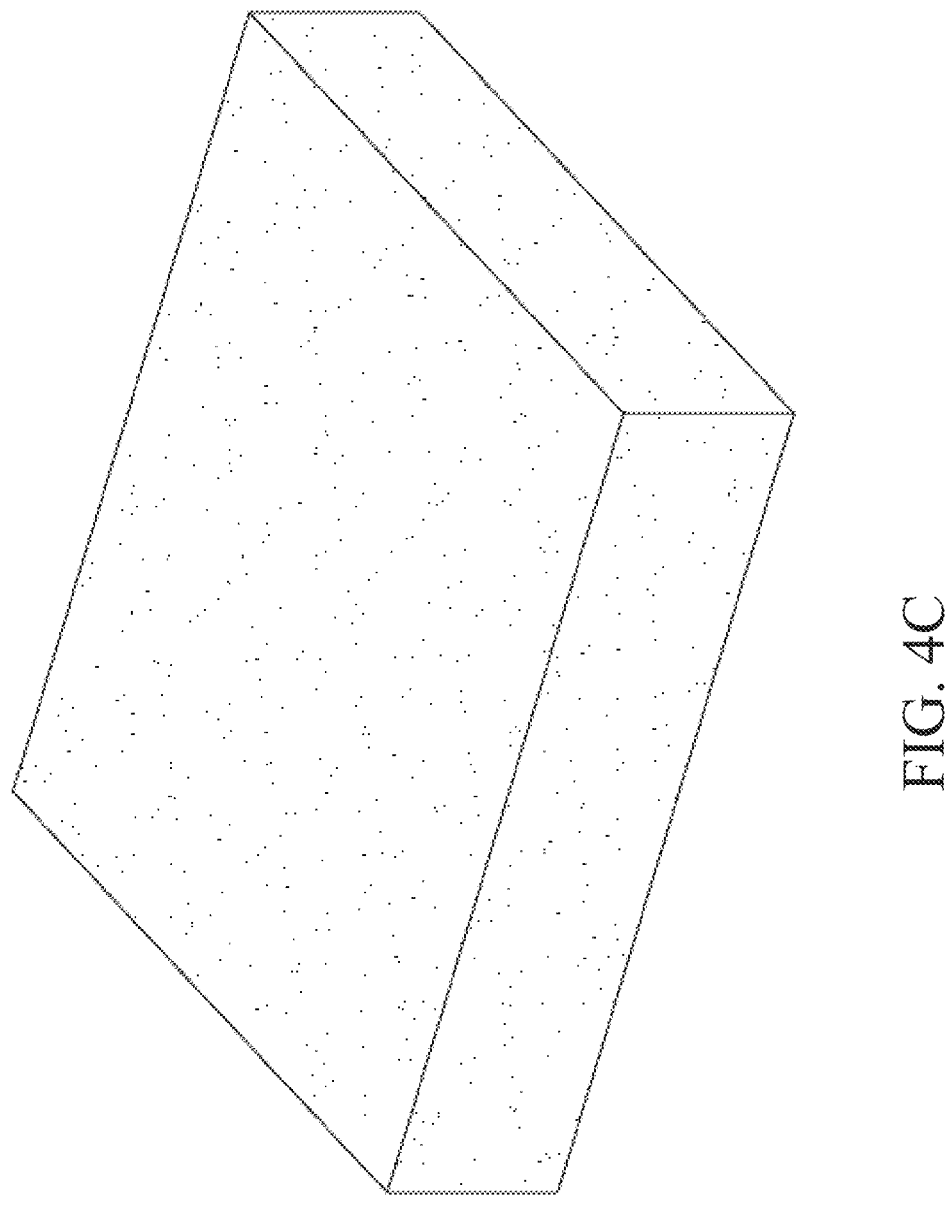
Figure 4C:

In some embodiments, in step 111, the processor 72 performs downsampling processing on the point cloud data of the 3D point cloud map to generate sparse point cloud data. In some embodiments, the downsampling processing includes voxel filtering. In some embodiments, the size of the voxel filtering is in a range of 0.1 m to 0.5 m. In some embodiments, the size of the voxel filtering is in a range of 0.2 m to 0.4 m. Referring to FIG. 4A, FIG. 4B, and FIG. 4C, FIG. 4, FIG. 4B, and FIG. 4C are schematic diagrams of downsampling according to an embodiment of this disclosure. FIG. 4A is an original point cloud map before downsampling, with dense and massive point clouds. FIG. 4B is a point cloud map under a downsampling size of 0.1 m. FIG. 4B has much fewer point clouds than the original point cloud diagram in FIG. 4A, but still has relatively complete details. FIG. 4C is a point cloud map under a downsampling size of 0.5 m, which has further fewer point clouds, but still has a clear overall shape and feature.

It may be seen from FIG. 4A to FIG. 4C that through the downsampling processing operation, a quantity of point clouds that need to be calculated is obviously reduced. In this way, a storage space occupation in the memory 71 can be reduced, so that a limited storage space can accommodate more data or supports more efficient data processing. In addition, a computing power required by the processor 72 in subsequent steps is reduced, thereby improving an overall processing speed. In addition, time consumption for calculation is reduced, so that real-time processing is possible. Finally, the downsampling processing further lowers a hardware requirement on the memory 71 and the processor 72, so that even a low-cost and low-power-consumption device can deal with a complex 3D data processing task. In conclusion, the downsampling processing can improve data processing efficiency, and can reduce resource occupation and a hardware requirement.

In some embodiments, the size range of the filtering may be adaptively adjusted based on a point cloud density. In some embodiments, a relatively small voxel filtering size is used for a region with dense point clouds to reduce data points, and a relatively large voxel filtering size is used for a region with sparse point clouds to maintain sufficient geometrical features. In this way, efficiency and effects of the downsampling can be further improved.

In some embodiments, in step 112, the processor 72 calculates a normal vector of each piece of point cloud data of the sparse point cloud data. In some embodiments, the normal vector may be calculated using a principal component analysis (PCA) algorithm. The PCA algorithm exhibits high computing precision in uniform point clouds and demonstrates robust consistency in normal vector orientations, which brings a stable outcome. It automatically adapts to local geometric structures without requiring predefined models, and can be easily implemented. In some embodiments, the normal vector may be calculated using a random sampling consensus (RANSAC) algorithm. The RANSAC algorithm demonstrates remarkable robustness with strong noise resistance, can effectively captures edge normal vectors while preserving sharp features through a model voting mechanism, and exhibits desirable model flexibility.

In some embodiments, in step 113, the processor 72 determines a magnitude of an angle between each piece of point cloud data and adjacent point cloud data based on the normal vector. In some embodiments, in step 114, the processor 72, determines whether each piece of point cloud data is to a boundary contour point cloud based on the magnitude of the angle, to extract boundary contour point cloud data. In some embodiments, the extracting boundary contour point cloud data includes the following steps: 1. calculating a normal vector of the point cloud, and estimating a normal vector of each point cloud by searching a local field of each point cloud, wherein the local field can be either: (a) a predetermined number (for example but not limited to, 20-50) of nearest point clouds to the given point, or (b) a spatial range within a certain distance (for example but not limited to a spherical area with a radius of 0.3 m-1 m) from the given point cloud; and 2. analyzing, point by point, whether each point is a boundary point cloud, selecting a tangent plane of a local region of each point cloud for projection, projecting a point cloud near the point cloud to the tangent plane to form an angular point, connecting the angular point and the point cloud, and calculating all angles formed by two adjacent straight lines and the point cloud, if a largest angle is greater than a threshold (for example, 90°), the point cloud being a boundary contour.

In some embodiments, when point cloud data is a boundary contour point cloud, an angle between the point cloud data and adjacent point cloud data is greater than a preset angle (for example, but not limited to, 60 degrees), which may be understood as that the point cloud data is located on a wall surface. Therefore, it may be determined that the point cloud data is boundary contour point cloud.

Figure 5A:
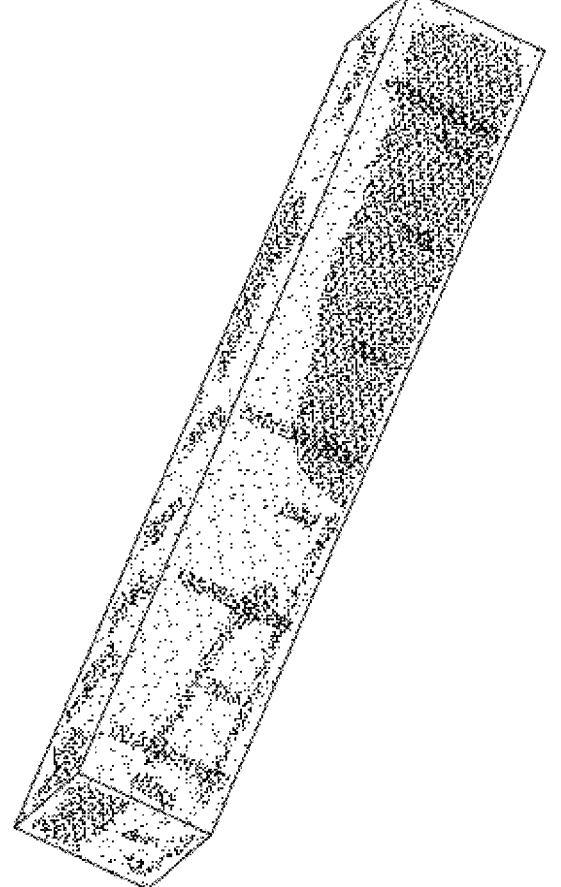
FIG. 5A and FIG. 5B are schematic diagrams with a height coordinate value being assigned as 0 according to an embodiment of this disclosure.
Figure 5A:
Figure 5B:
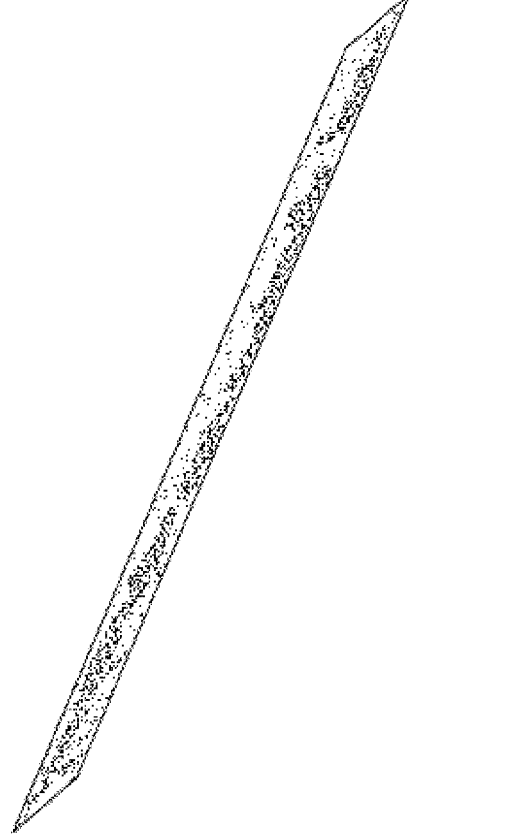
Figure 5B:
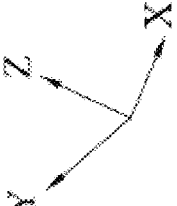

In some embodiments, in step 115. the processor 72 assigns 0 to a height coordinate value of the boundary contour point cloud data to generate the 2D point cloud data. In some embodiments, assigning 0 to the height coordinate value of the boundary contour point cloud data can convert a 3D point cloud map into a 2D point cloud map, thereby implementing 2D (dimension reduction) processing. Referring to FIG. 5A and FIG. 5B, FIG. 5A and FIG. 5B are schematic diagrams with a height coordinate value being assigned as 0 according to an embodiment of this disclosure. FIG. 5A is a 3D point cloud data map in a normal case, with point clouds being distributed in three dimensions, X, Y, and Z. FIG. 5B is a 2D point cloud data map, with a height coordinate value being 0. All point clouds in the 2D point cloud map in which a height coordinate is made zero are compressed onto a same plane. Through the dimension reduction processing, a data storage demand can be significantly reduced, complexity of a subsequent processing algorithm can be reduced, processing efficiency can be improved, and a planar geometrical feature can be maintained.

Figure 6:
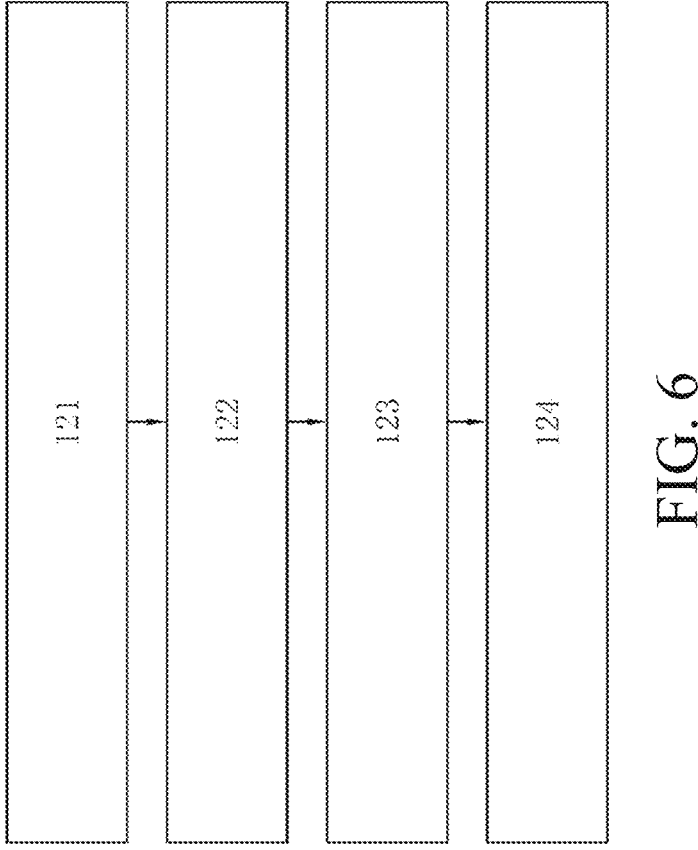
FIG. 6 is a detailed method process of step 12 according to an embodiment of this disclosure.

Referring to FIG. 2 again, in some embodiments, in step 12, the processor 72 performs straight line extraction processing on the 2D point cloud data to generate straight line data. In some embodiments, the straight line data indicates a wall position in the point cloud map. For a detailed description of step 12, refer to FIG. 6. FIG. 6 is a detailed method process of step 12 according to an embodiment of this disclosure. If a substantially same result can be obtained, the implementation of this disclosure is not completely limited to the steps of the process shown in FIG. 6. In some embodiments, step 12 may include step 121, step 122, step 123, and step 124.

Figure 7:
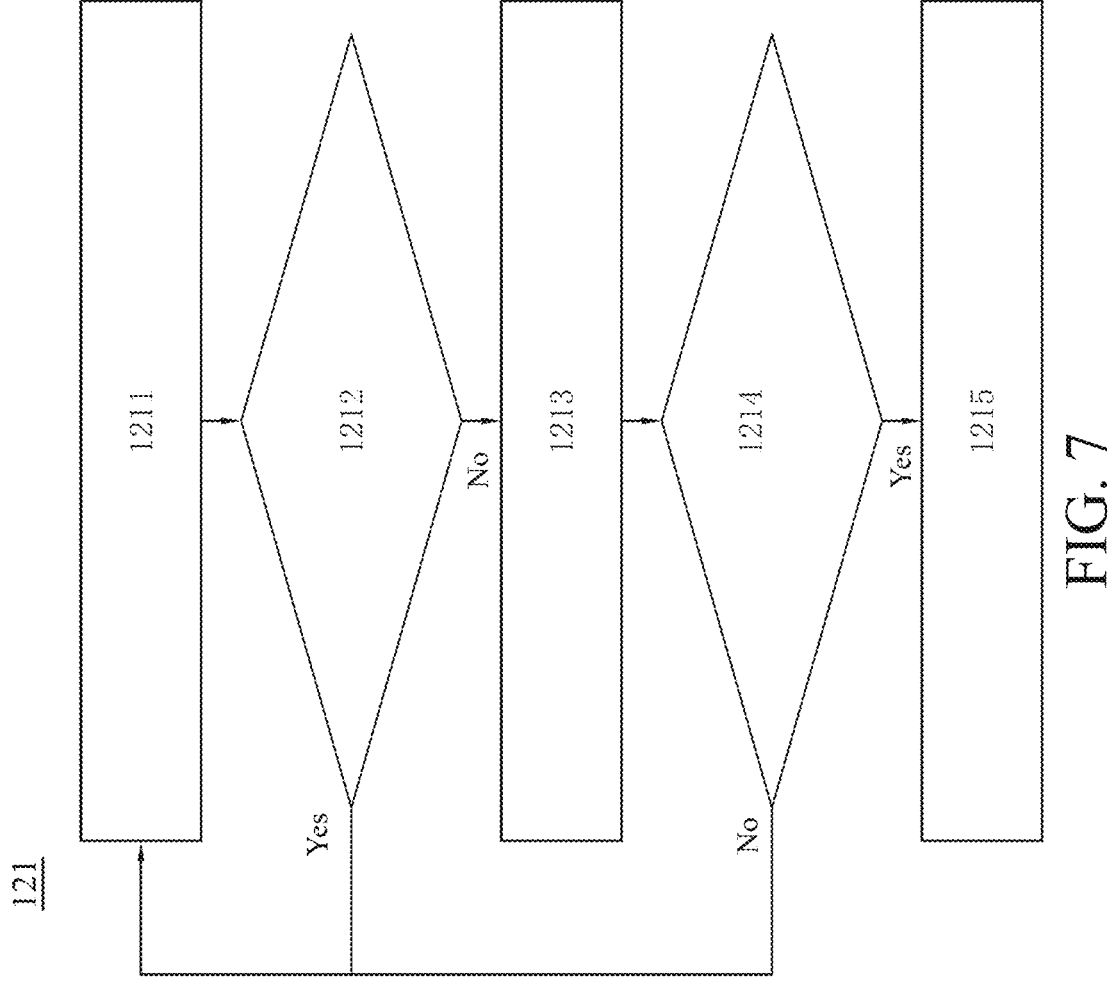
FIG. 7 is a detailed method process of step 121 according to an embodiment of this disclosure.

In some embodiments, in step 121, the processor 72 may perform radius filtering processing on the 2D point cloud data to generate 2D filtered point cloud data. For a detailed description of step 121, refer to FIG. 7. FIG. 7 is a detailed method process of step 121 according to an embodiment of this disclosure. If a substantially same result can be obtained, the implementation of this disclosure is not completely limited to the steps of the process shown in FIG. 7. In some embodiments, step 121 may include step 1211, step 1212, step 1213, step 1214, and step 1215.

In some embodiments, in step 1211, the processor 72 may select one piece of point data in the 2D point cloud data. In some embodiments, a point cloud may be selected through traversal. For example, point clouds may be processed one by one based on a storage sequence. In some embodiments, a point cloud may alternatively be selected through random sampling, to improve processing efficiency.

In some embodiments, in step 1212, the processor 72 may determine whether a quantity of point clouds included in selected 2D point cloud data within a filtering radius exceeds a preset threshold. If so, step 1211 is re-performed; and if not, step 1213 is performed. In some embodiments, the preset threshold is 15 pieces of point cloud data. In some embodiments, in step 1213, the processor 72 may filter out the selected 2D point cloud data. In some embodiments, when a piece of 2D point cloud data is point cloud data located at a wall position, the 2D point cloud data includes, within a fixed range (for example, a filtering radius), a particular quantity of point cloud data that is also located at the wall position. In other words, if only a small quantity of pieces of point cloud data are within the fixed range, the 2D point cloud data is not located at the wall position. In some embodiments, if the selected 2D point cloud data has less than 15 pieces of point cloud data in a filtering radius (for example, 0.05 m), the selected 2D point cloud data is filtered out.

Figure 8A:
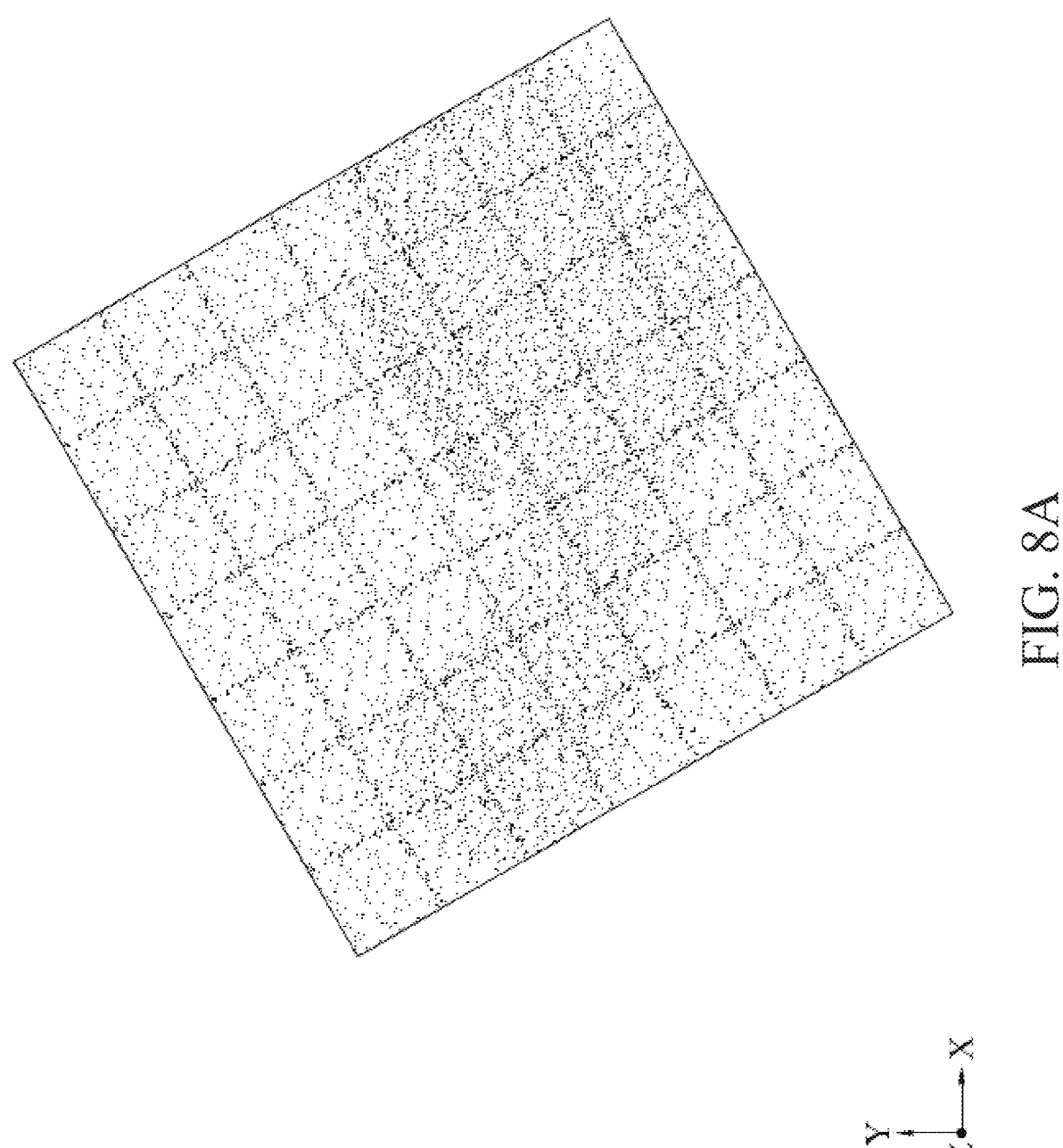
FIG. 8A and FIG. 8B are schematic diagrams of radius filtering according to an embodiment of this disclosure.
Figure 8B:
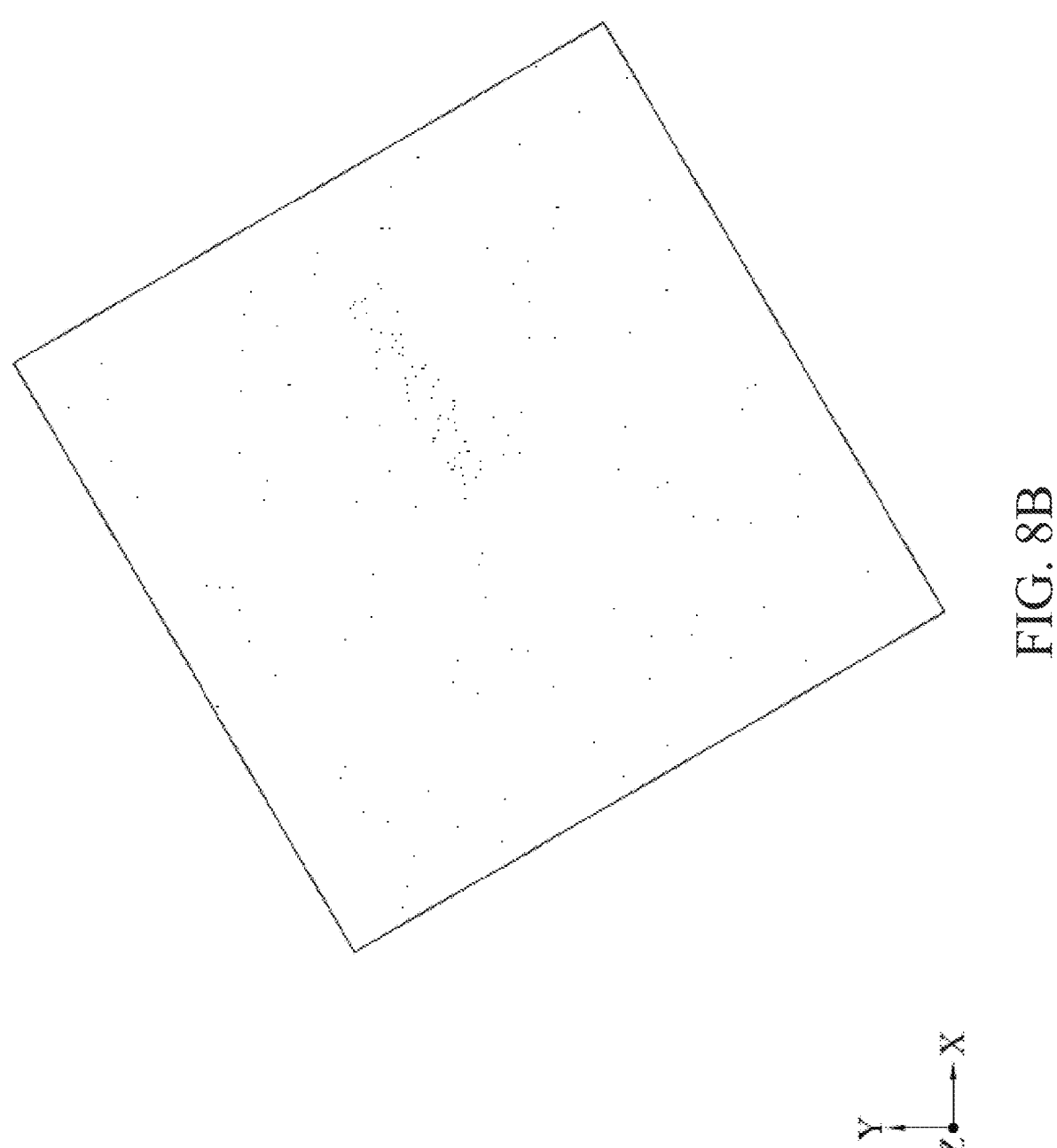

Referring to FIG. 8A and FIG. 8B, FIG. 8A and FIG. 8B are schematic diagrams of radius filtering according to an embodiment of this disclosure. FIG. 8A is a diagram of a radius filtering effect of under a filtering radius of 0.05 m and a preset quantity of 5, showing a relatively loose filtering characteristic. When the preset quantity is 5, only extreme isolated points are filtered out, to reserve more detailed features. FIG. 8B is a diagram of a radius filtering effect under a filtering radius of 0.05 m and a preset quantity of 15, showing a stricter filtering standard. When the preset quantity is 15, random noise on the wall surface can be effectively filtered out. It may be easily understood from the embodiments of FIG. 8A and FIG. 8B that, the filtering radius and the preset quantity may be selected to achieve different radius filtering effects, thereby effectively reserving point cloud data located at a wall position. In some embodiments, the size range and the preset quantity for the radius filtering may be adaptively adjusted. In some embodiments, the size of the radius filtering may be determined based on a point cloud density, for example, a quantity of point clouds included per cubic meter. In some embodiments, a higher average point cloud density means a larger filtering radius, and a lower average point cloud density means a smaller filtering radius. In some embodiments, the filtering radius is adaptively adjusted in a range of 0.03 m to 0.1 m.

In some embodiments, in step 1214, the processor 72 may determine whether all 2D point cloud data is traversed. If so, step 1215 is performed, and if not, step 1211 is re-performed. In some embodiments, in step 1215, the processor 72 may generate filtered point cloud data.

Referring to FIG. 6 again, in some embodiments, in step 122, the processor 72 may extract a straight line equation and a corresponding straight line point cloud from the 2D filtered point cloud data. In some embodiments, initial straight line detection may be performed on the 2D filtering point cloud through the RANSAC algorithm. In some embodiments, the straight line equation and the corresponding straight line point cloud may be cyclically extracted from the 2D filtered point cloud data. In some embodiments, the straight line equation and the corresponding straight line point cloud may be cyclically extracted from the 2D filtered point cloud data five to eight times. In some embodiments, a plurality of iterative cycles may include successively deleting identified inliers, thereby avoiding repeated feature extraction.

In some embodiments, in step 123, the processor 72 may traverse all straight line point clouds in the filtered point cloud data. In some embodiments, in step 124, the processor 72 may select a straight line point cloud including a largest quantity of point clouds to generate data corresponding to the straight line. In some embodiments, the data of the straight line may be expressed as an equation. An equation of the straight line may be expressed as $a(x-x_0)+b(y-y_0)=0$, a and b representing direction vectors of the straight line, and $(x_0, y_0)$ representing coordinates of any point on the straight line.

Figure 9:
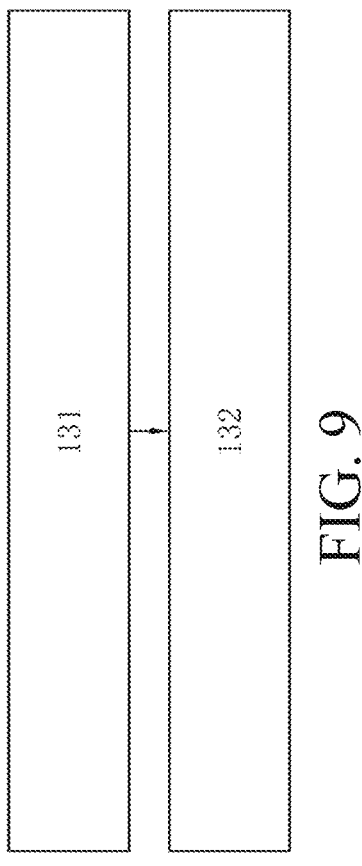
FIG. 9 is a detailed method process of step 13 according to an embodiment of this disclosure.

Referring to FIG. 2 again, in some embodiments, in step 13, the processor 72 calculates a rotation angle of the 3D point cloud map based on the straight line data. For a detailed description of step 13, refer to FIG. 9. FIG. 9 is a detailed method process of step 13 according to an embodiment of this disclosure. If a substantially same result can be obtained, the implementation of this disclosure is not completely limited to the steps of the process shown in FIG. 9. In some embodiments, step 13 may include step 131 and step 132.

In some embodiments, in step 131, the processor 72 may calculate a corresponding straight line normal vector based on the straight line data. In some embodiments, normalization processing may be simultaneously performed during calculation of the straight line normal vector. In some embodiments, in step 132, the processor 72 may calculate a rotation angle θ of the point cloud map based on the straight line normal vector. The rotation angle θ represents an angle by which the 3D point cloud map needs to be rotated relative to a vertical axis (Z axis). In some embodiments, when the straight line normal vector is expressed as (a, b), the rotation angle θ may be expressed as arctan (b/a).

Figure 10A:
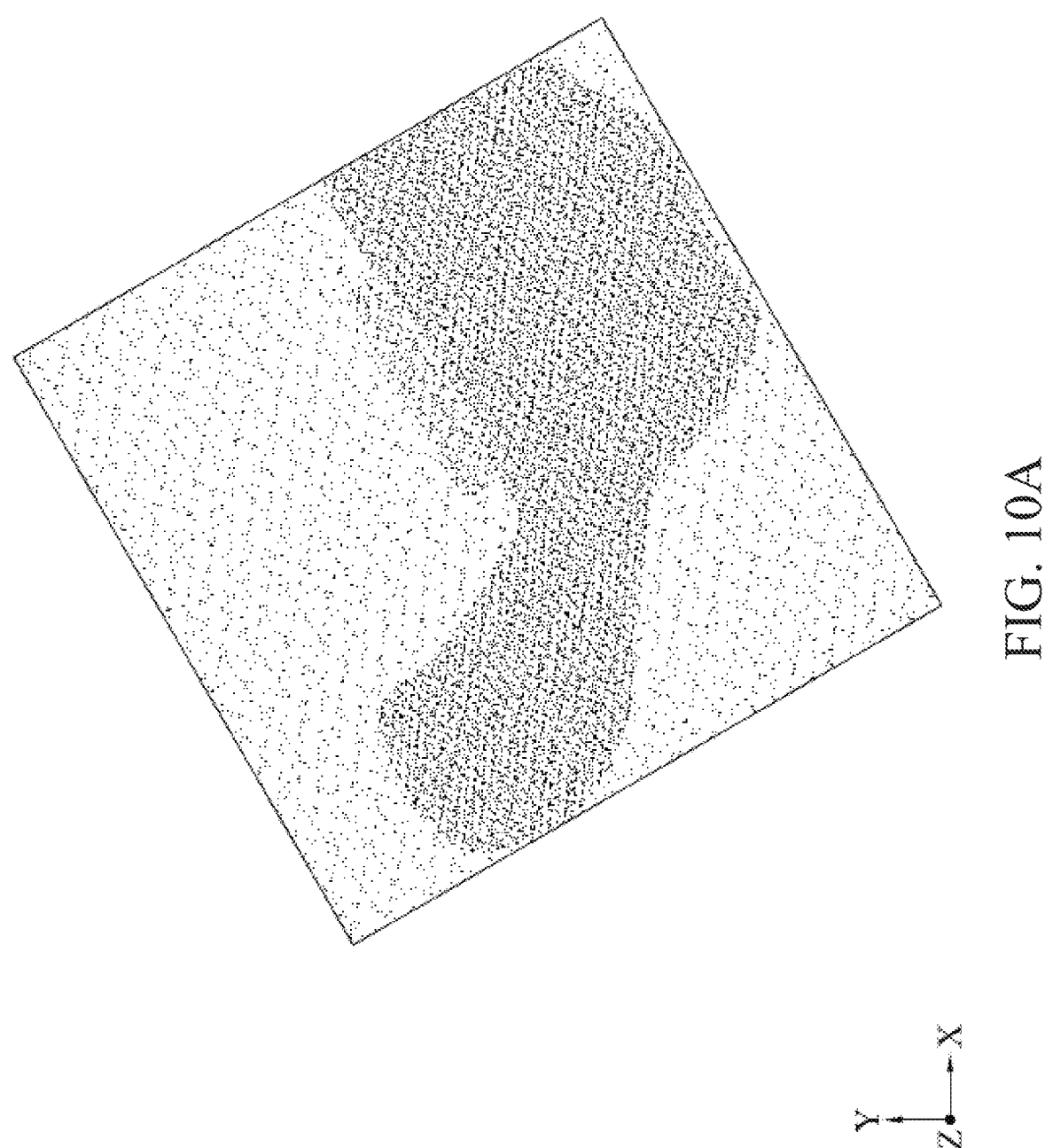
FIG. 10A and FIG. 10B are schematic diagrams of automatically rotating a 3D point cloud map according to an embodiment of this disclosure.
Figure 10B:
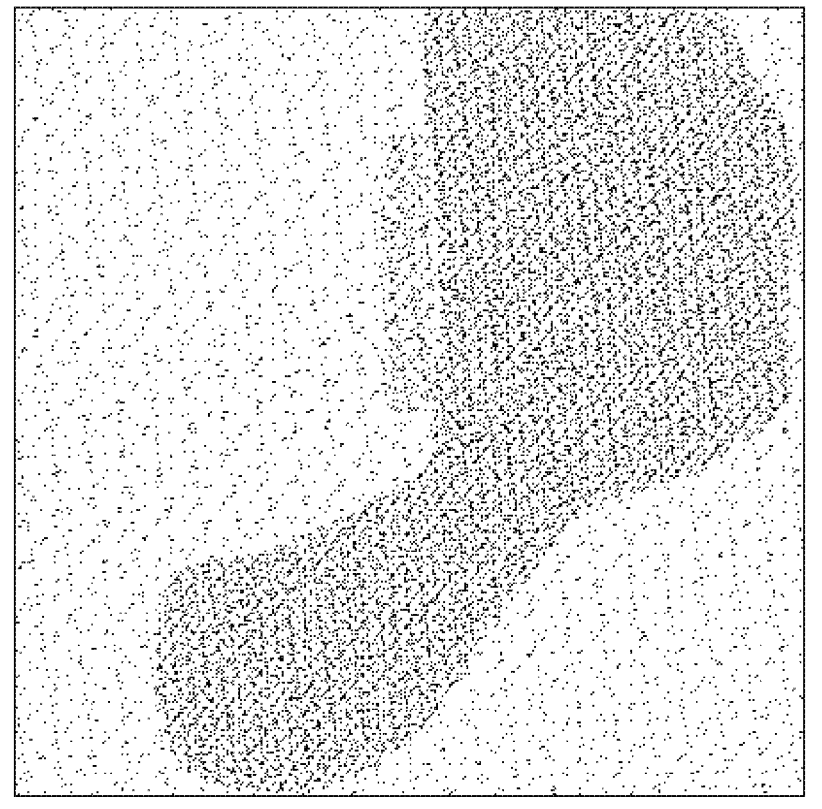
Figure 10B:
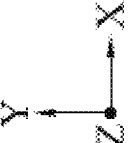

Referring to FIG. 2 again, in some embodiments, in step 14 the processor 72 rotates the 3D point cloud map based on the rotation angle θ, to enable at least one boundary of the 3D point cloud map to be parallel to at least one coordinate axis of a world coordinate system. Referring to FIG. 10A and FIG. 10B, FIG. 10A and FIG. 10B are schematic diagrams of automatically rotating a 3D point cloud map according to an embodiment of this disclosure. FIG. 10A is a 3D point cloud map before rotation. FIG. 10B is a 3D point cloud map after the 3D point cloud map is rotated relative to a vertical axis (Z axis) by 0.

In some embodiments, after the point cloud map is rotated, a correction effect may be verified using the PCA algorithm. In some embodiments, a feature vector of a point cloud covariance matrix may be calculated, and it is determined that alignment succeeds when an angle between a largest feature vector and a coordinate axis is less than a particular angle (for example, 3-5 degrees).

In some embodiments, after the point cloud map is rotated, the rotated map may be output to a display device. In some embodiments, after the point cloud map is rotated, the rotated map may be transmitted to the memory 71 for storage and real-time accessed by the processor 72. In some embodiments, after the point cloud map is rotated, the rotated map may be transmitted to various types of storage devices via multiple transmission methods (such as wired, wireless, or various communication protocols) for access.

In some embodiments, after the point cloud map is rotated, the autonomous mobile machine 30 may plan movement path based on the rotated 3D point cloud map. In some embodiments, after the point cloud map is rotated, the autonomous mobile machine 30 may locate equipment or task locations based on the rotated 3D point cloud map. In some embodiments, after the point cloud map is rotated, the autonomous mobile machine 30 may execute tasks based on the rotated 3D point cloud map, including but not limited to: performing operations such as picking, placing, and transporting goods in warehouse environments.

In the method for processing data of a 3D point cloud map provided in this disclosure, the rotation angle θ is calculated through data processing, and the 3D point cloud map is rotated relative to the vertical axis (Z axis) by 0, so that at least one boundary of the 3D point cloud map may be parallel to at least one coordinate axis of the world coordinate system, to implement automatic orthogonality, thereby providing convenience for construction or operation personnel, and resolving a problem of low precision of manual operation.

As used herein, the terms "approximately", "substantially", "substantial", and "about" are used to describe and account for small variations. When used in combination with an event or a circumstance, the terms may refer to instances in which the event or the circumstance occurs precisely as well as instances in which the event or the circumstance occurs to a close approximation. As used herein with respect to a given numerical value or range, the term "about" overall means falling within a range of ±10%, ±5%, ±1%, or ±0.5% of the given numerical value or range. The range may be expressed herein as being from one endpoint to another endpoint or between two endpoints. Unless otherwise specified, all ranges disclosed herein include endpoints. A term "substantially coplanar" may refer to two surfaces positioned within a few micrometers (μm) along a same plane, for example, within 10 μm, 5 μm, 1 μm, or 0.5 μm along a same plane. When reference is made to "substantially" the same numerical values or characteristics, the term may refer to a numerical value within ±10%, ±5%, ±1%, or ±0.5% of an average of the numerical values.

As used herein, the terms "approximately", "substantially", "substantial", and "about" are used to describe and explain small variations. When used in combination with an event or a circumstance, the terms may refer to instances in which the event or the circumstance occurs precisely as well as instances in which the event or the circumstance occurs to a close approximation. For example, when used in combination with a numerical value, the term may mean a range of variation less than or equal to ±10%, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05% of the numerical value. For example, if a difference between two numerical values is less than or equal to ±10% (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%) of an average of the numerical values, the two values may be considered to be "substantially" or "approximately" the same. For example, "substantially" parallel may refer to a range of angular variation less than or equal to ±10°, for example, less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05° with respect to 0°. For example, "substantially" perpendicular may refer to a range of angular variation less than or equal to #10°, for example, less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05° with respect to 90°.

For example, if a displacement between two surfaces is equal to or less than 5 μm, equal to or less than 2 μm, equal to or less than 1 μm, or equal to or less than 0.5 μm, the two surfaces may be considered to be coplanar or substantially coplanar. If a displacement between any two points on a surface relative to a plane is equal to or less than 5 μm, equal to or less than 2 μm, equal to or less than 1 μm, or equal to or less than 0.5 μm, the surface may be considered to be planar or substantially planar.

As used herein, unless otherwise specified in the context, the singular terms "a/an" and "the" may include a plurality of referents. In the description of some embodiments, an assembly provided "on" or "above" another assembly may encompass a case in which the preceding assembly is directly on the succeeding assembly (for example, is in physical contact with the succeeding assembly) and a case in which one or more intermediate assemblies are located between the preceding assembly and the succeeding assembly.

As used herein, for ease of description, terms spatially relative to each other such as "under", "below", "lower portion", "on", "above", "upper portion", "left side", and "right side" may be used herein to describe a relationship between an assembly or a feature and another assembly or another feature illustrated in the figures. In addition to the orientations described in the figures, the terms spatially relative to each other are intended to encompass different orientations of an apparatus during use or operation. The device may be oriented in another manner (rotated by 90 degrees or located in another orientation), and the terms spatially relative to each other used herein may be explained accordingly. It should be understood that, when an assembly is referred to as being "connected" or "coupled" to another assembly, the assembly may be directly connected to or coupled to the another assembly, or an intermediate assembly may exist.

A plurality of embodiments of the present disclosure and detailed features are briefly described above. The embodiments described in the present disclosure may be easily used as a basis for designing or modifying other processes and a structure configured to execute the same or similar purposes and/or obtain the same or similar advantages of the embodiments introduced in the present disclosure. Such equivalent construction does not depart from the spirit and scope of the present disclosure, and various variations, replacements, and modifications may be made without departing from the spirit and scope of the present disclosure.

We claim:

1. A method for processing data of a three-dimensional (3D) point cloud map, comprising:
   performing two-dimensional (2D) processing on point cloud data of the 3D point cloud map to generate 2D point cloud data, at least one boundary of the 3D point cloud map being a straight line;
   performing straight line extraction processing on the 2D point cloud data to generate straight line data;
   calculating a rotation angle of the 3D point cloud map based on the straight line data;
   rotating the 3D point cloud map based on the rotation angle, to enable at least one boundary of the 3D point cloud map to be parallel to at least one coordinate axis of a world coordinate system;
   generating a movement task path based on a rotated 3D point cloud map; and
   controlling an autonomous mobile machine by transmitting signals through a processor, to cause the autonomous mobile machine to move according to the movement task path.

2. The method for processing data of a 3D point cloud map according to claim 1, wherein the 2D processing comprises:
   performing downsampling processing on the point cloud data of the 3D point cloud map to generate sparse point cloud data.

3. The method for processing data of a 3D point cloud map according to claim 2, wherein the 2D processing further comprises:
   calculating a normal vector of each piece of point cloud data of the sparse point cloud data.

4. The method for processing data of a 3D point cloud map according to claim 3, wherein the 2D processing further comprises:
   determining a magnitude of an angle between each piece of point cloud data and adjacent point cloud data based on the normal vector; and
   determining whether each piece of point cloud data is a boundary contour point cloud based on the magnitude of the angle, to extract boundary contour point cloud data.

5. The method for processing data of a 3D point cloud map according to claim 4, wherein the 2D processing further comprises:
   assigning 0 to a height coordinate value of the boundary contour point cloud data to generate the 2D point cloud data.

6. The method for processing data of a 3D point cloud map according to claim 2, wherein the downsampling processing comprises voxel filtering.

7. The method for processing data of a 3D point cloud map according to claim 6, wherein the size of the voxel filtering is in a range of 0.2-0.4 m.

8. The method for processing data of a 3D point cloud map according to claim 1, wherein the straight line extraction processing comprises:
   performing radius filtering processing on the 2D point cloud data to generate 2D filtered point cloud data.

9. The method for processing data of a 3D point cloud map according to claim 8, wherein the radius filtering processing comprises:

determining whether a quantity of point clouds comprised in each piece of 2D point cloud data within a filtering radius exceeds a preset threshold.

10. The method for processing data of a 3D point cloud map according to claim 9, wherein the radius filtering processing further comprises:

filtering out point cloud data comprising point clouds of a quantity that does not exceed the preset threshold within the filtering radius, to generate the filtered point cloud data.

11. The method for processing data of a 3D point cloud map according to claim 9, wherein the filtering radius is 0.05 m.

12. The method for processing data of a 3D point cloud map according to claim 9, wherein the preset threshold is 15.

13. The method for processing data of a 3D point cloud map according to claim 8, wherein the straight line extraction processing further comprises:

extracting a straight line equation and a corresponding straight line point cloud from the 2D filtered point cloud data, the straight line equation being expressed as:

$$a(x{-}x_0){+}b(y{-}y_0){=}0,$$

a and b representing direction vectors of a straight line, and (x0, y0) representing coordinates of any point on the straight line.

14. The method for processing data of a 3D point cloud map according to claim 13, wherein the straight line extraction processing further comprises:

traversing all straight line point clouds in the filtered point cloud data; and selecting a straight line point cloud comprising a largest quantity of point clouds to generate the straight line data.

15. The method for processing data of a 3D point cloud map according to claim 1, wherein the straight line data indicates a wall position in the point cloud map.

16. The method for processing data of a 3D point cloud map according to claim 1, wherein the calculating a rotation angle of the point cloud map based on the straight line data comprises:

calculating a corresponding straight line normal vector based on the straight line data.

17. The method for processing data of a 3D point cloud map according to claim 16, wherein the calculating a rotation angle of the point cloud map based on the straight line data further comprises:

calculating the rotation angle of the point cloud map based on the straight line normal vector.

18. The method for processing data of a 3D point cloud map according to claim 17, wherein when the straight line normal vector is (a, b), the rotation angle is arctan (b/a).

19. A controller, comprising a processor configured to execute a program instruction to implement the following steps:

performing two-dimensional (2D) processing on point cloud data of a three-dimensional (3D) point cloud map to generate 2D point cloud data, at least one boundary of the 3D point cloud map being a straight line;

performing straight line extraction processing on the 2D point cloud data to generate straight line data;

calculating a rotation angle of the 3D point cloud map based on the straight line data;

rotating the 3D point cloud map based on the rotation angle, to enable at least one boundary of the 3D point cloud map to be parallel to at least one coordinate axis of a world coordinate system;

generating a movement task path based on a rotated 3D point cloud map; and controlling an autonomous mobile machine by transmitting signals through the processor, to cause the autonomous mobile machine to move according to the movement task path.

20. An autonomous mobile machine, comprising a processor configured to execute a program to implement the following steps:

performing two-dimensional (2D) processing on point cloud data of a three-dimensional (3D) point cloud map to generate 2D point cloud data, at least one boundary of the 3D point cloud map being a straight line;

performing straight line extraction processing on the 2D point cloud data to generate straight line data;

calculating a rotation angle of the 3D point cloud map based on the straight line data;

rotating the 3D point cloud map based on the rotation angle, to enable at least one boundary of the 3D point cloud map to be parallel to at least one coordinate axis of a world coordinate system;

generating a movement task path based on a rotated 3D point cloud map; and transmitting signals through the processor, to cause the autonomous mobile machine to move according to the movement task path.

\* \* \* \* \*